(12) United States Patent
Butcher et al.

(10) Patent No.: US 10,589,334 B2
(45) Date of Patent: Mar. 17, 2020

(54) DAMPENING ASSEMBLY FOR CAN BODYMAKER RAM

(71) Applicant: Stolle Machinery Company, LLC, Centennial, CO (US)

(72) Inventors: Gregory H. Butcher, Naples, OH (US); Aaron E. Carstens, Centerville, OH (US); Ian Kenneth Scholey, Lone Tree, CO (US); Daniel A. Jansen, Cincinnati, OH (US)

(73) Assignee: Stolle Machinery Company, LLC, Centennial, CO (US)

( * ) Notice: Subject to any disclaimer, the term of this patent is extended or adjusted under 35 U.S.C. 154(b) by 155 days.

(21) Appl. No.: 15/860,702

(22) Filed: Jan. 3, 2018

(65) Prior Publication Data

US 2019/0201962 A1  Jul. 4, 2019

(51) Int. Cl.
*B21D 22/00* (2006.01)
*B21D 22/30* (2006.01)
*B21D 51/26* (2006.01)
*B21D 22/28* (2006.01)
*B21D 24/00* (2006.01)
*B21D 22/20* (2006.01)

(52) U.S. Cl.
CPC ............ *B21D 22/30* (2013.01); *B21D 22/28* (2013.01); *B21D 51/26* (2013.01); *B21D 22/20* (2013.01); *B21D 24/00* (2013.01)

(58) Field of Classification Search
CPC ........ B21D 22/30; B21D 22/28; B21D 51/26; B21D 24/00; B21D 22/20
USPC .......................................................... 72/347
See application file for complete search history.

(56) References Cited

U.S. PATENT DOCUMENTS

| 3,735,629 A | 5/1973 | Paramonoff |
| 3,916,499 A | 11/1975 | Frame et al. |
| 4,173,138 A | 11/1979 | Main et al. |
| 4,530,228 A | 7/1985 | Snyder et al. |
| 4,934,167 A | 6/1990 | Grims et al. |
| 5,154,075 A | 10/1992 | Hahn et al. |
| 5,687,605 A | 11/1997 | Main |
| 5,775,160 A | 7/1998 | Fleischer et al. |
| 2008/0041133 A1 | 2/2008 | Gombas |

(Continued)

FOREIGN PATENT DOCUMENTS

WO   WO1990009851   9/1990

OTHER PUBLICATIONS

Stolle Machinery Company, LLC, PCT/US2016/064601 International Search Report, dated Feb. 21, 2017, 16 pages.

(Continued)

*Primary Examiner* — David B Jones
(74) *Attorney, Agent, or Firm* — Eckert Seamans Cherin & Mellott, LLC

(57) ABSTRACT

A can bodymaker includes a housing assembly, a drive mechanism, a ram assembly, a domer assembly, and a ram body dampening assembly. The ram assembly includes an elongated ram body. The drive mechanism is operatively coupled to the ram assembly so that the drive mechanism imparts a reciprocating motion to the ram body. The ram body dampening assembly is disposed adjacent the ram body path of travel. The ram body dampening assembly includes a housing and a dampening member. The dampening member is disposed immediately adjacent the ram body path of travel.

15 Claims, 4 Drawing Sheets

(56) References Cited

U.S. PATENT DOCUMENTS

| | | | |
|---|---|---|---|
| 2010/0082269 A1 | 4/2010 | Davies | |
| 2014/0083156 A1* | 3/2014 | Butcher | B21D 22/22 |
| | | | 72/347 |
| 2014/0260500 A1 | 9/2014 | Fleischer et al. | |
| 2015/0059429 A1* | 3/2015 | Butcher | B21D 51/26 |
| | | | 72/347 |
| 2016/0121385 A1 | 5/2016 | Butcher et al. | |
| 2017/0128999 A1* | 5/2017 | Butcher | B21D 22/30 |
| 2019/0201962 A1* | 7/2019 | Butcher | B21D 22/30 |

OTHER PUBLICATIONS

Stolle Machinery Company, LLC, U.S. Appl. No. 14/471,043, Mechanism and Design for Addressing Ram Droop, filed Aug. 28, 2014.

Stolle Machinery Company, LLC , PCT/US2018/067603 PCT International Search Report, dated Apr. 15, 2019, 10 pages.

* cited by examiner

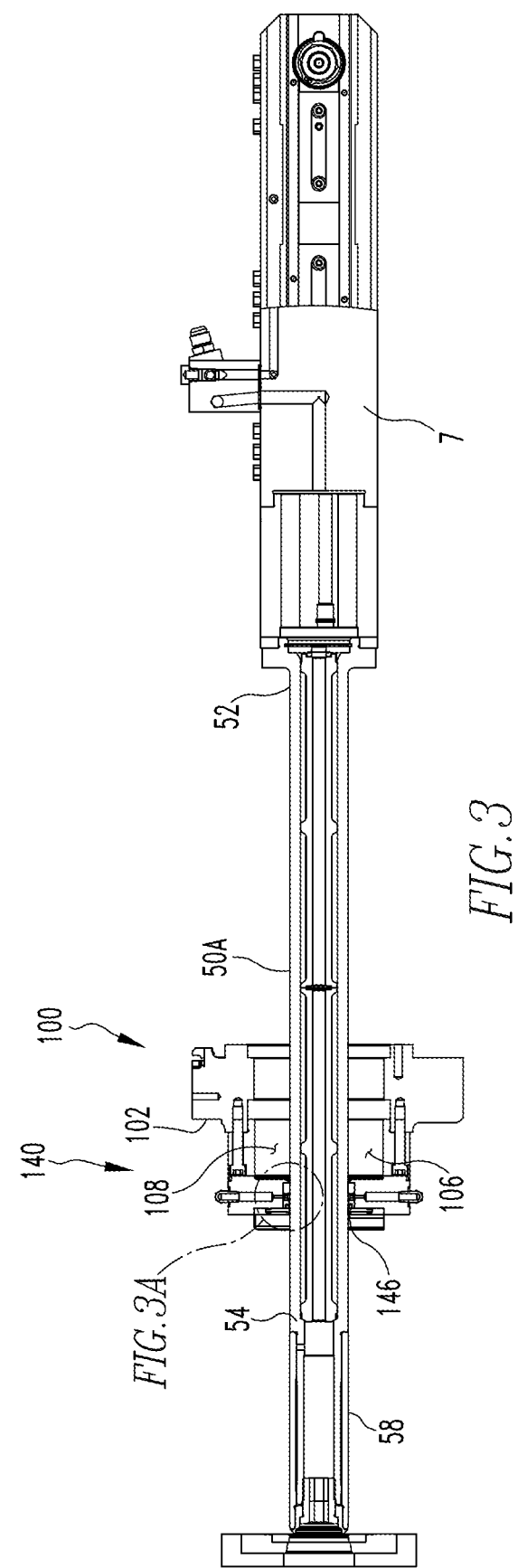

DAMPENING ASSEMBLY FOR CAN BODYMAKER RAM

BACKGROUND OF THE INVENTION

Field of the Invention

The disclosed and claimed concept relates to a can bodymaker wherein the ram assembly has a reduced length and, more specifically to a dampening assembly for a reduced length ram body.

Background Information

Generally, an aluminum can begins as a disk of aluminum, also known as a "blank," that is punched from a sheet or coil of aluminum. That is, the sheet is fed into a dual action press where a "blank" disc is cut from the sheet by an outer slide/ram motion. An inner slide/ram then pushes the "blank" through a draw process to create a cup 2, FIG. 1. The cup has a bottom and a depending sidewall. The cup is fed into a bodymaker 1, which performs a redraw and ironing operation. More specifically, the cup 2 is disposed in a can forming machine at the mouth of a die pack 6 having substantially circular openings therein. The cup 2 is held in place by a redraw sleeve, which is part of the redraw assembly 8. The redraw sleeve is a hollow tubular construct that is disposed inside the cup 2 and biases the cup against the die pack 6. More specifically, the first die in the die pack 6 is the redraw die, which is not a part of the redraw assembly. The cup 2 is biased against the redraw die by the redraw sleeve. Other dies, the ironing dies, are disposed behind, and axially aligned with, the redraw die. The ironing dies and redraw die are not part of the redraw assembly. An elongated, cylindrical ram assembly 1, shown in FIGS. 1 and 1A, includes a carriage 7 that supports a ram 9 with a punch at the forward, distal end. The ram 9 and punch are aligned with, and structured to travel through, the openings in the redraw die and the ironing dies. At the end of the die pack 6 opposite the ram is a domer "D". The domer is a die structured to form a concave dome in the bottom of the cup/can. Further, the ram 9 was supported by a bearing "B" disposed before the die pack 6. A seal assembly "S" was disposed between the bearing assembly "B" and the die pack 6. The seal assembly "S" removed coolant and lubricant from the ram.

Thus, in operation, a cup is disposed at one end of the die pack. The cup, typically, has a greater diameter than a finished can as well as a greater wall thickness. The redraw sleeve is disposed inside of the cup and biases the cup bottom against the redraw die. The opening in the redraw die has a diameter that is smaller than the cup. The elongated ram body, and more specifically the punch, passes through the hollow redraw sleeve and contacts the bottom of the cup. As the ram body continues to move forward, the cup is moved through the redraw die. As the opening in the redraw die is smaller than the original diameter of the cup, the cup is deformed and becomes elongated with a smaller diameter. The wall thickness of the cup, typically, remains the same as the cup passes through the redraw die. As the ram continues to move forward, the elongated cup passes through a number of ironing dies. The ironing dies each thin the wall thickness of the cup causing the cup to elongate. The final forming of the can body occurs when the bottom of the elongated cup engages the domer, creating a concave dome in the cup bottom. At this point, and compared to the original shape of the cup, the can body is elongated, has a thinner wall, and a domed bottom. This process is repeated as the ram body reciprocates. That is, the ram travels toward, and through, the die pack on a forward stroke, and, travels backwards through the die pack and away from the die pack on a return stroke.

After the forming operations on the can body are complete, the can body is ejected from the ram, and more specifically the punch, for further processing, such as, but not limited to trimming, washing, printing, flanging, inspecting, and placed on pallets, which are shipped to the filler. At the filler, the cans are taken off of the pallets, filled, ends placed on them and then the filled cans are repackaged in six packs and/or twelve pack cases, etc.

Bodymakers 1 such as those described above have several known problems relating to the length of the ram as disclosed in U.S. patent application Ser. No. 14/471,043, and the Background Information portion thereof is incorporated herein by reference. As further disclosed in that application, a reduced length ram body having a length of between about 26.0 inches and 36.0 inches solves some of the problems of a longer ram. For example, a ram body with such a reduced length can operate without a forward bearing that supports and guides the ram body. A ram body with such a reduced length in operation without a forward bearing, in certain instances, however, has other problems such as vibration. That is, a ram body is prone to vibration upon, and after, the can body contacts the domer. As this contact occurs just before the ram body is withdrawn through the die pack, the ram body is likely to be vibrating as the ram body is being withdrawn through the die pack. Further, vibration of the ram body is also problem during redraw operations.

The bearing that supported prior art rams dampened the vibration. The newer, reduced length ram bodies, however, are not supported by a bearing and may vibrate as it passes through the die pack. This is a problem as the vibrating ram body may contact and/or damage the dies in the die pack. There is, therefore, a need for a bodymaker having a reduced length ram body that does not vibrate during the return stroke. That is, vibration of the ram body during the return stroke is a stated problem.

SUMMARY OF THE INVENTION

These needs, and others, are met by at least one embodiment of the disclosed and claimed concept which provides a can bodymaker including a housing assembly, a drive mechanism, a ram assembly, a domer assembly, and a ram body "dampening assembly." A "dampening assembly" includes a "dampening member," which, as defined below, does not provide support to the ram body. As such, a bearing is not a "dampening member" and a bearing assembly is not, as used herein, a "dampening assembly." The ram body dampening assembly is disposed adjacent the ram body path of travel. The ram body dampening assembly includes a housing and the dampening member. The dampening member is coupled to the ram body dampening assembly housing. The dampening member is disposed immediately adjacent the ram body path of travel. A dampening assembly in the configuration described or claimed below solves the problems stated above. That is, for example, the dampening assembly in the configuration described or claimed below is structured to dampen vibration of the ram body as the ram body is withdrawn through the die pack, during redraw operations, and/or at any position between the ram body first and second positions.

BRIEF DESCRIPTION OF THE DRAWINGS

A full understanding of the invention can be gained from the following description of the preferred embodiments when read in conjunction with the accompanying drawings in which:

FIG. 3 is a detail cross-sectional side view of a ram assembly and a dampening assembly.

DESCRIPTION OF THE PREFERRED EMBODIMENTS

Figure 1:
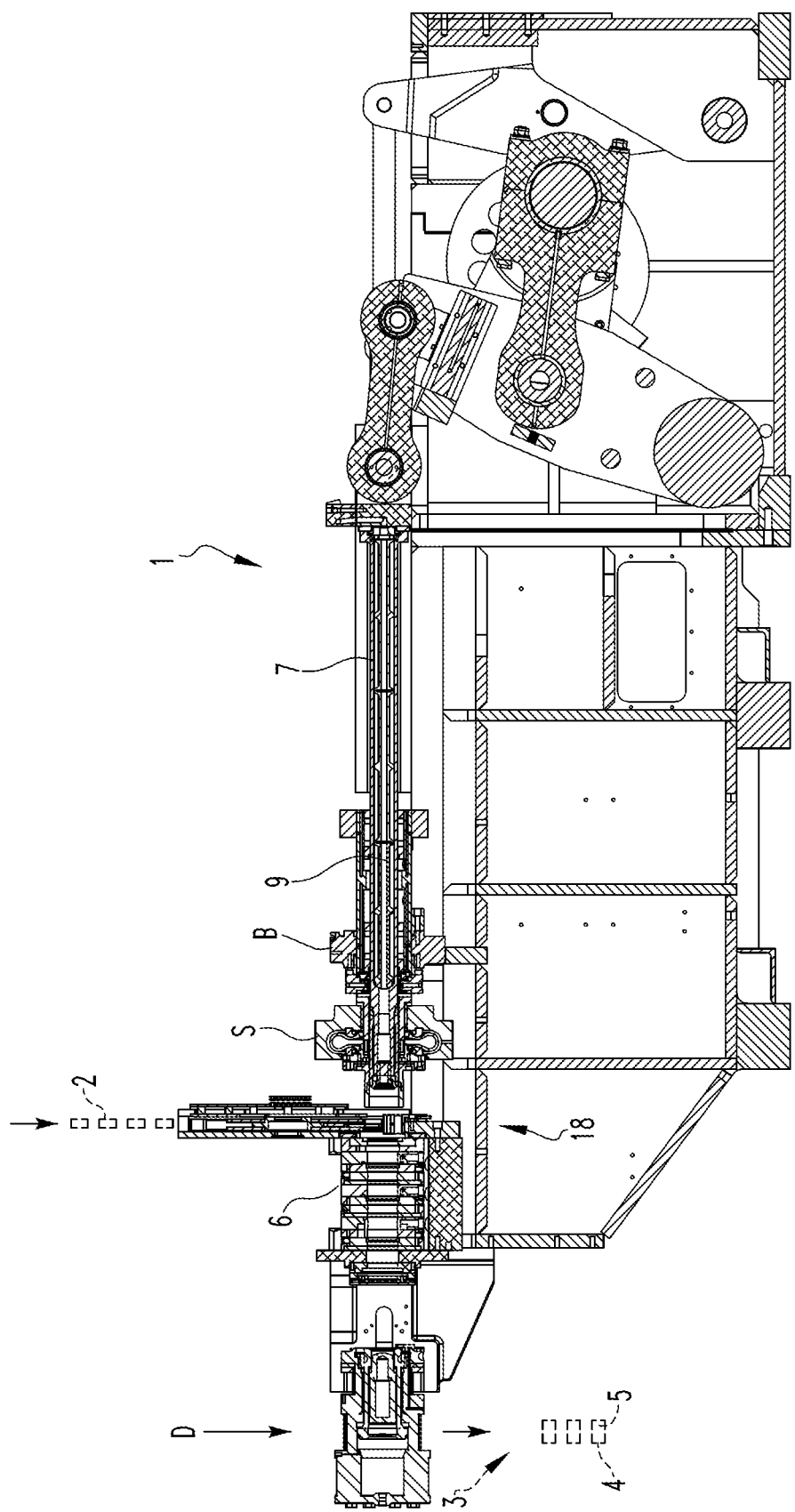
FIG. 1 is a cross-sectional side view of a prior art bodymaker.

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As described below, a bodymaker includes an elongated reciprocating ram assembly and a domer assembly. As used herein, the domer assembly is disposed at the "forward" end of the bodymaker. As used herein, when the ram assembly is adjacent the domer assembly, the ram assembly is at the "forward" end of its stroke. As used herein, the "rear" or "back" end of the bodymaker is disposed opposite the "forward" end. Further, as used herein, the bodymaker has a "longitudinal" direction that is parallel to the longitudinal axis of the ram assembly body, described below, as well as a "lateral" direction that is generally horizontal and perpendicular to the "longitudinal" direction.

As used herein, the singular form of "a," "an," and "the" include plural references unless the context clearly dictates otherwise.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies. As such, as used herein, "structured to [verb]" recites structure and not function. Further, as used herein, "structured to [verb]" means that the identified element or assembly is intended to, and is designed to, perform the identified verb. Thus, an element that is merely capable of performing the identified verb but which is not intended to, and is not designed to, perform the identified verb is not "structured to [verb]."

As used herein, "associated" means that the elements are part of the same assembly and/or operate together, or, act upon/with each other in some manner. For example, an automobile has four tires and four hub caps. While all the elements are coupled as part of the automobile, it is understood that each hubcap is "associated" with a specific tire.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not "coupled" to the lower object unless the upper object is otherwise maintained substantially in place. That is, for example, a book on a table is not coupled thereto, but a book glued to a table is coupled thereto.

As used herein, a "fastener" is a separate component structured to couple two or more elements. Thus, for example, a bolt is a "fastener" but a tongue-and-groove coupling is not a "fastener." That is, the tongue-and-groove elements are part of the elements being coupled and are not a separate component.

As used herein, the phrase "removably coupled" or "temporarily coupled" means that one component is coupled with another component in an essentially temporary manner. That is, the two components are coupled in such a way that the joining or separation of the components is easy and would not damage the components. For example, two components secured to each other with a limited number of readily accessible fasteners, i.e., fasteners that are not difficult to access, are "removably coupled" whereas two components that are welded together or joined by difficult to access fasteners are not "removably coupled." A "difficult to access fastener" is one that requires the removal of one or more other components prior to accessing the fastener wherein the "other component" is not an access device such as, but not limited to, a door.

As used herein, "temporarily disposed" means that a first element(s) or assembly(ies) is resting on a second element(s) or assembly(ies) in a manner that allows the first element/assembly to be moved without having to decouple or otherwise manipulate the first element. For example, a book simply resting on a table, i.e., the book is not glued or fastened to the table, is "temporarily disposed" on the table.

As used herein, "operatively coupled" means that a number of elements or assemblies, each of which is movable between a first position and a second position, or a first configuration and a second configuration, are coupled so that as the first element moves from one position/configuration to the other, the second element moves between positions/configurations as well. It is noted that a first element may be "operatively coupled" to another without the opposite being true.

As used herein, a "coupling assembly" includes two or more couplings or coupling components. The components of a coupling or coupling assembly are generally not part of the same element or other component. As such, the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component is a nut.

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are to fit "snugly" together. In that situation, the difference between the size of the components is even smaller whereby the amount of friction increases. If the element defining the opening and/or the component inserted into the opening are made from a deformable or compressible material, the opening may even be slightly smaller than the component being inserted into the opening. With regard to surfaces, shapes, and lines, two, or more, "corresponding" surfaces, shapes, or lines have generally the same size, shape, and contours.

As used herein, a "planar body" or "planar member" is a generally thin element including opposed, wide, generally parallel surfaces, i.e., the planar surfaces of the planar member, as well as a thinner edge surface extending between the wide parallel surfaces. That is, as used herein, it is inherent that a "planar" element has two opposed planar surfaces. The perimeter, and therefore the edge surface, may include generally straight portions, e.g., as on a rectangular planar member, or be curved, as on a disk, or have any other shape.

As used herein, a "path of travel" or "path," when used in association with an element that moves, includes the space an element moves through when in motion. As such, any element that moves inherently has a "path of travel" or "path."

As used herein, the statement that two or more parts or components "engage" one another shall mean that the elements exert a force or bias against one another either directly or through one or more intermediate elements or components. Further, as used herein with regard to moving parts, a moving part may "engage" another element during the motion from one position to another and/or may "engage" another element once in the described position. Thus, it is understood that the statements, "when element A moves to element A first position, element A engages element B," and "when element A is in element A first position, element A engages element B" are equivalent statements and mean that element A either engages element B while moving to element A first position and/or element A either engages element B while in element A first position.

As used herein, "operatively engage" means "engage and move." That is, "operatively engage" when used in relation to a first component that is structured to move a movable or rotatable second component means that the first component applies a force sufficient to cause the second component to move. For example, a screwdriver may be placed into contact with a screw. When no force is applied to the screwdriver, the screwdriver is merely "coupled" to the screw. If an axial force is applied to the screwdriver, the screwdriver is pressed against the screw and "engages" the screw. However, when a rotational force is applied to the screwdriver, the screwdriver "operatively engages" the screw and causes the screw to rotate. Further, with electronic components, "operatively engage" means that one component controls another component by a control signal or current.

As used herein, the word "unitary" means a component that is created as a single piece or unit. That is, a component that includes pieces that are created separately and then coupled together as a unit is not a "unitary" component or body.

As used herein, the term "number" shall mean one or an integer greater than one (i.e., a plurality).

As used herein, in the phrase "[x] moves between its first position and second position," or, "[y] is structured to move [x] between its first position and second position," "[x]" is the name of an element or assembly. Further, when [x] is an element or assembly that moves between a number of positions, the pronoun "its" means "[x]," i.e., the named element or assembly that precedes the pronoun "its."

As used herein, a "radial side/surface" for a circular or cylindrical body is a side/surface that extends about, or encircles, the center thereof or a height line passing through the center thereof. As used herein, an "axial side/surface" for a circular or cylindrical body is a side that extends in a plane extending generally perpendicular to a height line passing through the center. That is, generally, for a cylindrical soup can, the "radial side/surface" is the generally circular sidewall and the "axial side(s)/surface(s)" are the top and bottom of the soup can.

As used herein, the terms "can" and "container" are used substantially interchangeably to refer to any known or suitable container, which is structured to contain a substance (e.g., without limitation, liquid; food; any other suitable substance), and expressly includes, but is not limited to, beverage cans, such as beer and soda cans, as well as food cans.

As used herein, "generally curvilinear" includes elements having multiple curved portions, combinations of curved portions and planar portions, and a plurality of planar portions or segments disposed at angles relative to each other thereby forming a curve.

As used herein, a "contour" means the line or surface that defines an object. That is, for example, when viewed in cross-section, the surface of a three-dimensional object is reduced to two dimensions; thus, a portion of a three-dimensional surface contour is represented by a two-dimensional line contour.

As used herein, a "perimeter portion" means the area at the outer edge of a defined area, surface, or contour.

As used herein, "about" in a phrase such as "disposed about [an element, point or axis]" or "extend about [an element, point or axis]" or "[X] degrees about [an element, point or axis]," means encircle, extend around, or measured around. When used in reference to a measurement or in a similar manner, "about" means "approximately," i.e., in an approximate range relevant to the identified measurement as would be understood by one of ordinary skill in the art.

As used herein, "generally" means "in a general manner" relevant to the term being modified as would be understood by one of ordinary skill in the art.

As used herein, "substantially" means "for the most part" relevant to the term being modified as would be understood by one of ordinary skill in the art.

As used herein, "at" means on and near relevant to the term being modified as would be understood by one of ordinary skill in the art.

As used herein, "cantilever" or "cantilever member" means a projecting beam or other horizontal member supported at one or more points and having one unsupported end. With respect to a movable element, such as, but not limited to a ram body 50, described below, the movable element is a "cantilever member" if at any time during the element's motion, the element has an unsupported end. Thus, a ram body 50 is a "cantilever member" having a "cantilever length" (defined below) when the ram is in the first position and prior to the ram body 50 (or punch 58, discussed below) entering the die pack 16, discussed below.

As used herein, a "tension member" is a construct that has a maximum length when exposed to tension, but is otherwise substantially flexible, such as, but not limited to, a chain or a cable.

Figure 2:
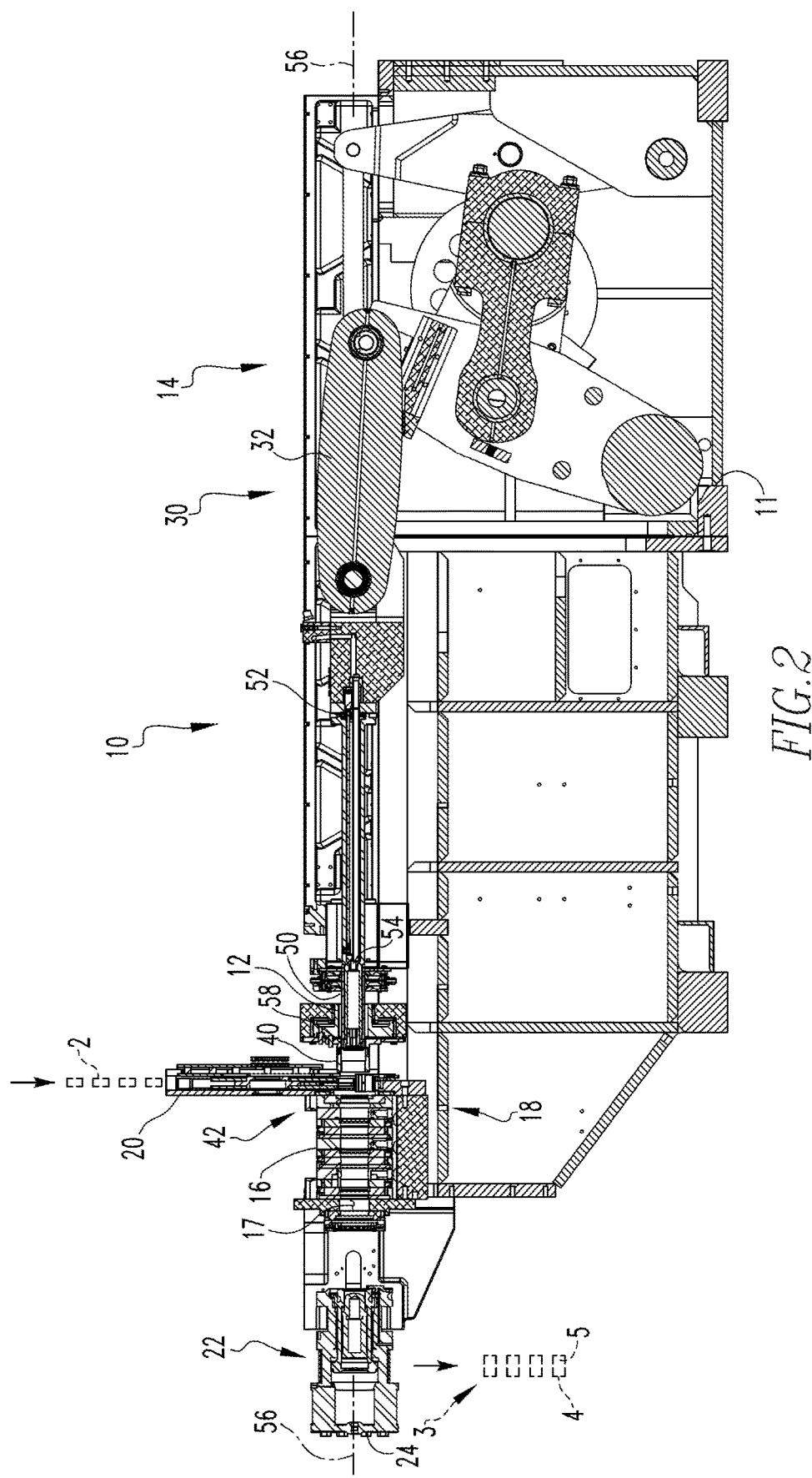
FIG. 2 is a cross-sectional side view of a bodymaker.

As shown in FIG. 2, a can bodymaker 10 is structured to convert a cup 2 (FIG. 2) into a can body 3 (FIG. 2). As described below, the cup 2, the ram body 50, the passage through the die pack 16, and other elements are assumed to have a substantially circular cross-section. It is understood, however, that the cup 2, as well as the resulting can body 3 and elements that interact with the cup 2 or can body 3, may have a shape other than substantially circular. A cup 2 has a bottom member 4 with a depending sidewall 5 defining a substantially enclosed space (none shown). The end of the cup opposite the bottom member 4 is open.

The can bodymaker 10 includes a housing assembly 11, a reciprocating ram assembly 12, a drive mechanism 14, a die pack 16, a redraw assembly 18, a cup feeder 20 and a domer assembly 22. Each of the elements identified above are coupled to the housing assembly 11. In an exemplary embodiment, the drive mechanism 14 includes a crank assembly 30 including a reciprocating crank arm 32. The drive mechanism 14 is operatively coupled to the ram assembly 12 and is structured to, and does, impart a reciprocating motion to a ram body 50, discussed below. As is known, in each cycle the cup feeder 20 positions a cup 2 in front of the die pack 16 with the open end facing the ram assembly 12. The die pack 16 defines a passage (17) through a number of dies (not shown). The domer assembly 22 includes a dome member 24 having a domed surface. The center/vertex of the dome member 24 is disposed generally, or substantially, on a line with the ram body longitudinal axis 56, discussed below. Further, the domer assembly 22 is disposed immediately adjacent the ram body 50 path of travel. When the cup 2 is in position in front of the die pack 16, a redraw sleeve 40 biases the cup 2 against a redraw die 42. As is known, the drive mechanism 14 drives the redraw sleeve 40, e.g., via a number of secondary crank arms (not shown), and is timed so that the redraw sleeve 40 advances just before the ram assembly 12 advances.

Generally, the ram assembly 12 includes the elongated, substantially circular, ram body 50 with a proximal end 52, a distal end 54, and a longitudinal axis 56. The ram body distal end 54 includes a punch 58. The ram body proximal end 52 is coupled to the drive mechanism 14. The drive mechanism 14 provides a reciprocal motion to the ram body 50 causing the ram body 50 to move back and forth generally along its longitudinal axis 56. That is, the ram body 50 is structured to reciprocate between a retracted, first position and a forward, second position over a path of travel. In the first, retracted position, the ram body 50 is spaced from the die pack 16. In the second, extended position, the ram body 50 extends through the die pack 16 with the punch 58 disposed immediately adjacent the dome member 24. That is, the cup disposed on, the punch 58 contacts the dome member 24. It is noted that the ram body 50 may be stopped, that is, the drive mechanism 14 may be stopped with the ram body 50, in any position between the first and second positions. Thus, the reciprocating ram assembly 12 advances forward (to the left as shown) passing through the redraw sleeve 40 and engaging the cup 2. The cup 2 is moved through the redraw die 42 and a number of ironing dies (not shown) within the die pack 16. The cup 2 is converted into a can body 3 within the die pack 16. That is, as the punch 58 carrying the can body 3 passes through the die pack 16, the can body 3 is formed and, more specifically, the can body 3 becomes elongated while the sidewall 5 becomes thinner. At the end of the forming stroke, a dome is formed in the can bottom member 4 when the can bottom member 4 engages the domer assembly 22 and the dome member 24. Further, at the start of the return stroke, the can body 3 is ejected from the punch 58 by any known method or device such as, but not limited to a stripper device or delivering a compressed gas to the inner side of the can body 3. At the start of the next forming stroke a new cup 2 is disposed in front of the die pack 16 and/or the end of the punch 58.

In an exemplary embodiment, the ram body 50 is a "reduced length ram body." As used herein, a "reduced length ram body" has a length of between about 26.0 inches and 36.0 inches. In an exemplary embodiment, the ram body 50 has a length about 34.5 inches. Further, the ram body 50 is a cantilever member. That is, the ram body proximal end 52 is coupled to the drive mechanism 14, as noted above, and the ram body distal end 54 is unsupported. Thus, the ram body 50 does not pass through a ram body bearing assembly, such as, but not limited to a bearing assembly including a bearing and the can bodymaker 10 does not include a ram body bearing assembly. As used herein a "ram body bearing assembly" means an assembly or device that is structured to, and does, provide more than negligible support to a ram body 50. As used herein, "negligible support" means an upward force of more than about 10% of the weight of the ram body 50.

Further, the ram body 50 is a cantilever member 90 that has a "cantilever length." As use herein, the "cantilever length" means the length of the cantilever member beyond the support that is closest to the unsupported end. Further, as used herein, an assembly or element that provides negligible support, or insignificant support, does not provide meaningful support to the ram body 50 and, therefore, does not change the "cantilever length" of the ram body 50. As noted above, in the prior art wherein a ram body 50 moved through a bearing assembly B, the cantilever length of the prior art ram body had a dynamic cantilever length. That is, the cantilever length depended upon the length of the ram body 50 extending through the bearing assembly. As the ram body 50 of the exemplary embodiment does not extend through a bearing assembly, the cantilever length of the cantilever member 90 remains constant during the reciprocal motion of the ram body 50.

Similarly, the ram body 50 is not directly guided by a ram body guide assembly. Thus, the ram body 50 does not pass through a ram body guide assembly, such as, but not limited to a ram body guide assembly including a guide bearing, such as, but not limited to, a hydrostatic/hydrodynamic bearing assembly, and, the can bodymaker 10 does not include a ram body guide assembly. As used herein, a "ram body guide assembly" means an assembly or device that directly contacts the ram body 50 and is structured to, and does, guide the ram body. As used herein, to "guide" a ram body means to continuously position of the ram body longitudinal axis 56 relative to the die pack 16. As used herein, "continuously position" means that one construct is in contact with another construct and provides more than insignificant support to a ram body 50. As used herein, "insignificant support" means an upward force of more than about 15% of the weight of the ram body 50. Further, as used herein, a "ram body guide assembly" cannot be a "ram body dampening assembly" as defined below. That is, any assembly that supports a ram body cannot be a "ram body dampening assembly." For example, and as used therein, any support or guide that changes the "cantilever length" of a ram body is not a "ram body dampening assembly."

Further, in an exemplary embodiment, the ram body 50 does not pass through a ram body seal assembly, and, the can bodymaker 10 does not include a ram body seal assembly. That is, as the ram body 50 is not lubricated in a manner similar to prior art ram bodies, the ram body 50 does not extend through a seal assembly structured to collect a substantial amount of lubricant. As used herein, a "ram body seal assembly" means an assembly through which a ram body passes and that is structured to remove a substantial amount of coolant and/or lubricant from the ram body 50. A "ram body seal assembly" may provide negligible support or insignificant support to a ram body 50. That is, elements such as, but not limited to, rubber seals in the ram body seal assembly may contact the ram body 50 and thereby provide negligible support or insignificant support to a ram body 50. Such seals, however, are not structured to dampen vibration in a ram body 50. That is, as used herein, a "ram body seal assembly" does not include any construct that is intended to dampen the vibration in a ram body 50. Any effect on ram body 50 vibration is incidental and, as such, a ram body seal assembly is not structured to dampen ram body 50 vibration. Thus, any construct in a "ram body seal assembly" that incidentally dampens vibration of a ram body 50 is not a "dampening member," as defined below.

Figure 3A:
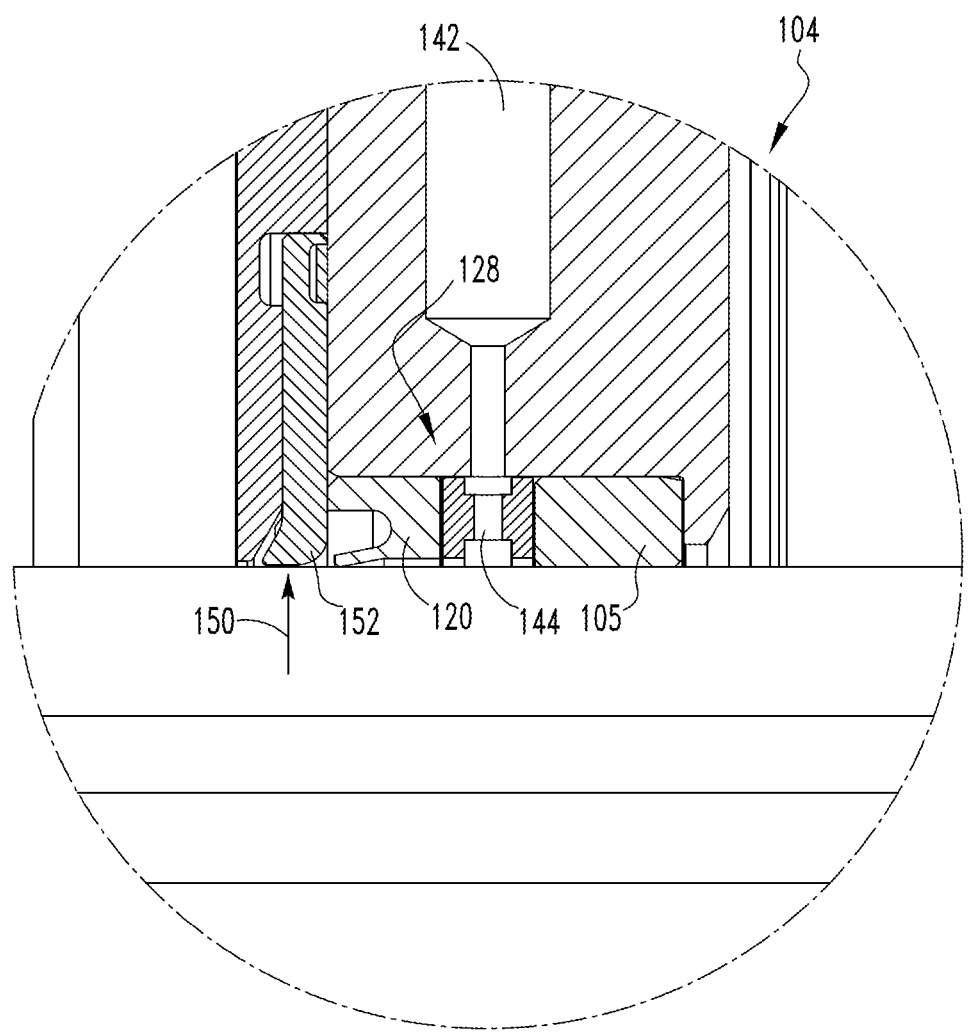
FIG. 3A is a detail cross-sectional side view of a ram assembly and a dampening assembly.

In an exemplary embodiment, the can bodymaker 10 includes a ram body dampening assembly 100, shown in FIGS. 3 and 3A. As used herein, a "ram body dampening assembly" 100 is a construct that is structured to dampen vibration of the ram body 50 during use. A "ram body dampening assembly" 100 does not provide more than negligible support or insignificant support to the ram body 50. The ram body dampening assembly 100 is structured to, and does, dampen vibration in the ram body 50 during operation of the can bodymaker 10. That is, as noted above, during operation of the can bodymaker 10 the ram assembly 12 with a cup 2 disposed over the punch 58 engages the dome member 24 which causes the ram body 50 to vibrate. This vibration is dampened by the ram body dampening assembly 100, i.e., a dampening member 104, discussed below. That is, as used herein, a "dampening member" is a construct structured to dampen the vibration in an elongated body that passes through, or adjacent, the "dampening member." To "dampen," as used herein, means to reduce the amplitude of a vibration in a vibrating construct. A "dampening member" is structured to, and does, provide "dampening engagement" with a vibrating elongated body. As used herein, "dampening engagement" (or to "dampeningly engage") means a rapid and intermittent contact with various locations about the perimeter of a vibrating element and, following the dampening of the vibrations, may also contact the element but does not provide more than negligible support or insignificant support to the ram body 50. As used herein, "dampening engagement" does not provide support to the elongated body. Conversely, if an element does provide support to an elongated body, as used herein, it does not provide "dampening engagement" to the elongated body and cannot be a "dampening member" as defined above. Further, "dampening" includes both "active" and "passive" dampening. As used herein, "active" dampening means that the "dampening assembly" is structured to, and does, detects the vibration and responds with a counter-vibration or other motion that dampens the vibration. Stated alternately, "active" dampening means that energy is expended in a manner that reduces vibration. As used herein, such a dampening assembly is identified as an "active dampening assembly." Thus, an "active dampening assembly" is structured to, and does, expend energy in a manner that reduces vibration in a vibrating element or assembly. Further, a "dampening member" in an "active dampening assembly" is identified herein as an "active dampening member." Conversely, "passive" dampening means that the "dampening assembly" is structured to, and is, acted upon by the vibrating member or element but does not expend energy in a manner that reduces vibration. That is, as used herein, a "passive dampening assembly" is structured to, and does, reduce vibration in a vibrating element or assembly without expending energy. For example, a dampening assembly that absorbs energy from a vibrating element or assembly and thereby reduced the vibration thereof is a "passive dampening assembly." Further, a "dampening member" in a "passive dampening assembly" is identified herein as a "passive dampening member."

In an exemplary embodiment, the ram body dampening assembly 100 is one of an active dampening assembly or a passive dampening assembly. In the embodiment shown in the figures, the ram body dampening assembly 100 is a passive dampening assembly. Thus, during the operation of the can bodymaker 10, the vibrating ram body 50, rapidly and intermittently contacts the dampening member 104 which dampeningly engages the vibrating ram body 50 and reduces the vibration therein.

Further, as used herein, a "dampening member" is structured to, and does, define an "air gap" which, as used herein, is the gap between the "dampening member" and the elongated body which it is structured to dampen when the elongated body is not vibrating. That is, the "air gap" only exists when the elongated body is not vibrating and disposed immediately adjacent the "dampening member." Thus, when the vibrating elongated body is a ram body 50, when the can bodymaker is not in operation and when the ram body 50 extends through the dampening member 104, there is an "air gap." It is further noted that, as used herein, an "air gap" does not exist when the elongated body is not disposed in or immediately adjacent the "dampening member." Thus, when the ram body 50 is in, or close to, the retracted, first position and is not disposed through, or adjacent, the dampening member 104, there is no "air gap" as defined herein. In an exemplary embodiment, the dampening member 104 includes a generally torus shaped body 105 that includes a generally circular passage 108 structured to allow the ram body 50 to pass therethrough. When the drive mechanism is stopped, e.g., for maintenance, with the ram body 50 extending through the dampening member passage 108, the dampening member passage 108 is between about 0.005 inch and 0.001 inch, or about 0.0025 inch, larger than the cross-sectional area of the ram body 50. Thus, when the ram body 50 is stationary, the dampening member 104 is structured to, and does, define an air gap about the ram body 50. That is, in the embodiment discussed above, the "air gap" between the outer surface of the ram body 50 and the inner surface of the dampening member body 105 is between about 0.005 inch and 0.001 inch, or about 0.0025 inch.

The ram body dampening assembly 100 is disposed adjacent the ram body 50 path of travel. In an exemplary embodiment, the ram body dampening assembly 100 includes a housing 102 and the dampening member 104. In an exemplary embodiment, the ram body dampening assembly housing 102 defines a passage 106 through which the ram body 50 extends. That is, the ram body dampening assembly housing 102 is disposed about the ram body 50 path of travel. In an alternate embodiment, not shown, the ram body dampening assembly housing 102 does not define a passage and is disposed adjacent the ram body 50 path of travel. The ram body dampening assembly housing passage 106 is considerably larger than the cross-sectional area of the ram body 50. That is, the ram body dampening assembly housing passage 106 is sufficiently large to prevent contact between the ram body 50 and the ram body dampening assembly housing 102 during normal operation of the can bodymaker 10.

As noted above, an exemplary dampening member 104 includes a generally torus shaped body 105 that defines a generally circular passage 108 structured to allow the ram body 50 to pass therethrough. In an exemplary embodiment, the dampening member body 105 is made from a resilient material such as, but not limited to, polyether ether ketone (PEEK). The dampening member passage 108 substantially corresponds to the cross-sectional area of the ram body 50. That is, the dampening member passage 108 is slightly larger than the cross-sectional area of the ram body 50 and is sized so that an air gap exists between the ram body 50 and the dampening member passage 108 when the ram body 50 extends through the dampening member passage 108 but not when the can bodymaker 10 is in operation. That is, during operation of the can bodymaker 10, the ram body 50 vibrates causing the ram body 50 to contact the dampening member 104 so that the air gap cannot be measured. In this configuration, the dampening member 104 is disposed immediately adjacent the ram body 50 path of travel. In an alternate embodiment, not shown, the dampening member body does not encircle the ram body 50. In another alternate embodiment, not shown, an inner surface of the dampening member body (105), i.e., the surface immediately adjacent the ram body (50) path of travel, includes a number of protrusions structured to dampeningly engage the ram body 50.

The dampening member 104 is coupled, directly coupled, or fixed to the ram body dampening assembly housing 102 and, as shown, in the ram body dampening assembly housing passage 108. The ram body dampening assembly housing 102 is disposed about (i.e., encircling) or adjacent the ram body 50 path of travel. In this configuration, the ram body 50 passes through the ram body dampening assembly housing passage 106 and the dampening member passage 108. Stated alternately, the ram body 50 path of travel extends through said dampening member passage 108. Further, in this configuration and in an exemplary embodiment, the ram body dampening assembly 100, i.e., the dampening member 104, does not support the ram body 50. That is while at rest, i.e., when the can bodymaker 10 is not in operation, the ram body 50 does not contact the dampening member 104 even when the ram body 50 is in the forward, second position. Stated alternately, the ram body longitudinal axis 56 is aligned with the dampening member passage 108 so that, when the can bodymaker 10 is not in operation, i.e., when the ram body 50 is stationary, and when the ram body 50 extends through the dampening member passage 108, the ram body 50 does not contact the dampening member 104. Stated alternately, the ram body 50 is, in an exemplary embodiment, a "non-active ram body" 50A. As used herein, a "non-active ram body" 50A means a ram body 50 that is stationary, and positioned to extend through the dampening member passage 108. Thus, in an exemplary embodiment, a non-active ram body does not contact the dampening member 104.

In an exemplary embodiment, the ram body 50 has a coolant applied thereto. In this embodiment, the ram body dampening assembly 100 also includes a number of seals 120 structured to remove coolant from the ram body 50. The ram body dampening assembly seals 120 do not support the ram body 50 but, in an exemplary embodiment, provide negligible support or insignificant support to the ram body 50. The ram body dampening assembly seals 120 are spaced from the dampening member 104. In this configuration, and when the ram body 50 extends through the ram body dampening assembly seals 120 and the dampening member 104, the ram body dampening assembly seals 120 and the dampening member 104 are structured to, and do, form an envelope 128 about the ram body 50.

The ram body dampening assembly 100, in an exemplary embodiment, also includes a purge air system 140. The purge air system 140 is disposed, or partially disposed in the ram body dampening assembly housing 102 and includes conduits 142 having a number of inlets 144 disposed adjacent the dampening member 104 and the ram body 50 path of travel. The purge air system 140 also includes a drain outlet 146. The purge air system 140 is structured to, and does, provide pressurized gas, such as, but not limited to, air, that expels collected coolant via the drain outlet 146. That is, the purge air system inlets 144 and drain outlet 146 are disposed in the envelope 128. The purge air system 140 is structured to, and does, provide a pressurized fluid to the envelope 128. The pressurized fluid in the envelope 128 causes coolant and other matter on the ram body 50 to be expelled via the drain outlet 146.

The ram body dampening assembly 100, in an exemplary embodiment, also includes an emergency stripper 150. The emergency stripper 150 includes a body 152 disposed immediately adjacent the ram body 50 path of travel. If a can body 3 contacts the emergency stripper body 152 during the ram body 50 return stroke, the emergency stripper body 152 engages the can body and prevents the can body 3 from continuing to move with the ram body 50. This action removes the can body 3 from the ram body 50 as the ram body moves backward through the ram body dampening assembly 100.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A ram body dampening assembly for a can bodymaker, said bodymaker including an elongated ram body, said ram body structured to reciprocate between a retracted, first position and a forward, second position, said ram body dampening assembly comprising:
   a ram body dampening assembly housing;
   a dampening member; and
   said dampening member coupled to said ram body dampening assembly housing.

2. The ram body dampening assembly of claim 1 wherein said dampening member is structured to define an air gap about said ram body.

3. The ram body dampening assembly of claim 2 wherein said air gap is between about 0.001 inch and 0.005 inch.

4. The ram body dampening assembly of claim 2 wherein said dampening member defines a generally circular passage structured to allow said ram body to pass therethrough.

5. The ram body dampening assembly of claim 2 wherein:
said ram body dampening assembly housing includes a purge air system and a number of seals;
said seals and said dampening member structured to define an envelope about said ram body; and
said purge air system structured to provide a pressurized fluid to said envelope.

6. A can bodymaker comprising:
a housing assembly;
a drive mechanism, said drive mechanism coupled to said housing assembly;
a ram assembly including an elongated ram body;
said drive mechanism operatively coupled to said ram assembly wherein said drive mechanism imparts a reciprocating motion to said ram body;
said ram body moving between a retracted, first position and a forward, second position over a path of travel;
a dourer assembly coupled to said housing assembly and disposed immediately adjacent the ram body path of travel;
a ram body dampening assembly disposed adjacent said ram body path of travel;
said rain body dampening assembly including a housing and a dampening member;
said dampening member coupled to said ram body dampening assembly housing; and
said dampening member disposed immediately adjacent the rain body path of travel.

7. The can bodymaker of claim 6 wherein said dampening member defines an air gap about said ram body.

8. The can bodymaker of claim 7 wherein said air gap is between about 0.001 inch and 0.005 inch.

9. The can bodymaker of claim 6 wherein:
said dampening member defines a generally circular passage structured to allow said ram body to pass therethrough;
said ram body path of travel extending through said dampening member passage; and
wherein, when said ram body is stationary and extending through said dampening member passage, said dampening member defines an air gap about said ram body.

10. The can bodymaker of claim 9 wherein said air gap is between about 0.001 inch and 0.005 inch.

11. The can bodymaker of claim 10 wherein said air gap is about 0.0025 inch.

12. The can bodymaker of claim 7 wherein:
said ram body dampening assembly housing includes a purge air system and a number of seals;
said seals and said dampening member structured to define an envelope about said ram body; and
said purge air system structured to provide a pressurized fluid to said envelope.

13. The can bodymaker of claim 6 wherein:
said ram body has a cantilever length; and
as said ram body moves between said retracted, first position and a forward; second position, said ram body cantilever length does not change.

14. The can bodymaker of claim 6 wherein
said dampening member defines a generally circular passage structured to allow said ram body to pass therethrough;
said ram body path of travel extending through said dampening member passage; and
wherein; when said ram body is stationary and extending through said dampening member passage, said ram body does not contact said dampening member.

15. The can bodymaker of claim 6 wherein:
the ram body is a non-active ram body; and
wherein, said non-active ram body does not contact said dampening member.

* * * * *